(12) United States Patent
Brink et al.

(10) Patent No.: US 7,916,799 B2
(45) Date of Patent: Mar. 29, 2011

(54) FREQUENCY OFFSET CORRECTION FOR AN ULTRAWIDEBAND COMMUNICATION SYSTEM

(75) Inventors: Stephan ten Brink, Irvine, CA (US); Ravishankar H. Mahadevappa, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 848 days.

(21) Appl. No.: 11/696,113

(22) Filed: Apr. 3, 2007

(65) Prior Publication Data

US 2007/0268976 A1 Nov. 22, 2007

Related U.S. Application Data

(60) Provisional application No. 60/788,610, filed on Apr. 3, 2006.

(51) Int. Cl.
*H04L 27/28* (2006.01)
(52) U.S. Cl. ........................................................ 375/260
(58) Field of Classification Search .................. 375/259, 375/260, 316, 346, 344
See application file for complete search history.

(56) References Cited

U.S. PATENT DOCUMENTS

| | | | |
|---|---|---|---|
| 7,149,266 B1 | 12/2006 | Imamura et al. | |
| 7,180,965 B2 | 2/2007 | Eilts et al. | |
| 2002/0101840 A1* | 8/2002 | Davidsson et al. | 370/330 |
| 2007/0183514 A1* | 8/2007 | Iancu et al. | 375/260 |

FOREIGN PATENT DOCUMENTS

WO WO 2000/070802 A1 11/2000

OTHER PUBLICATIONS

Written Opinion of the International Searching Authority for International Application No. PCT/US2007/008436, filed Apr. 3, 2007, Written Opinion dated Jun. 23, 2008 and mailed Jul. 7, 2008 (7 pgs.).
International Search Report for International Application No. PCT/US2007/008436, filed Apr. 3, 2007, International Search Report dated Jun. 23, 2008 and mailed Jul. 7, 2008 (2 pgs.).

* cited by examiner

*Primary Examiner* — Kevin M Burd
(74) *Attorney, Agent, or Firm* — Thomas, Kayden, Horstemeyer & Risley, LLP

(57) ABSTRACT

A method and a receiver system for subcarrier-specific frequency offset correction including frequency offset estimation, updating and compensation. The method includes initial frequency offset estimation in time domain using packet preamble, frequency offset compensation during channel estimation symbols using the initial frequency offset estimate, and frequency offset update tracking during header and data part both being performed in the frequency domain. The initial frequency offset estimation includes using a sum over a number of time lagged autocorrelation results, corresponding to a number of the last consecutive symbols of the preamble part of the packet with the autocorrelations being the result of a sum over a window of cross-correlations between the incoming signal and the respective packet synchronization sequence. The receiver includes receiver blocks for initial frequency offset estimation, frequency offset compensation, frequency offset update tracking and obtaining a current frequency offset estimate.

38 Claims, 12 Drawing Sheets

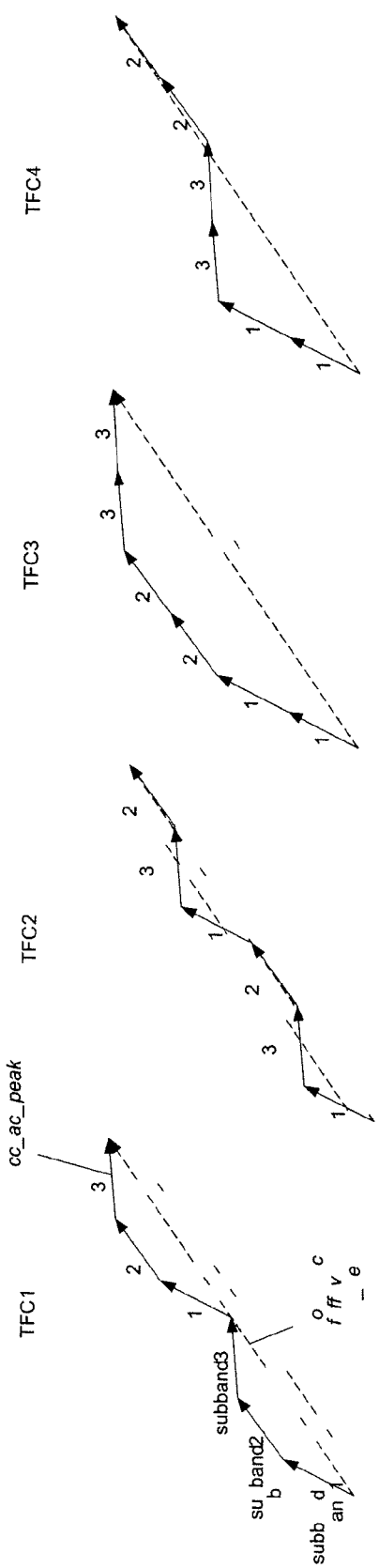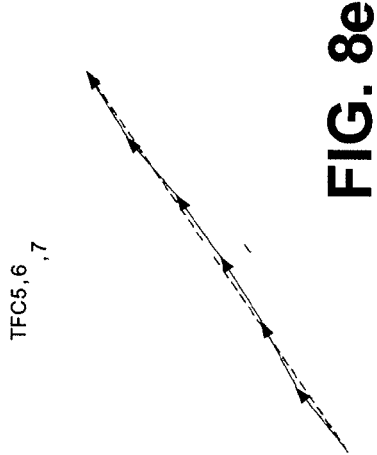
FIG. 8a FIG. 8b FIG. 8c FIG. 8d FIG. 8e

FREQUENCY OFFSET CORRECTION FOR AN ULTRAWIDEBAND COMMUNICATION SYSTEM

CROSS-REFERENCE TO RELATED APPLICATION(S)

This Application claims the benefit of U.S. Provisional Patent Application No. 60/788,610, filed on Apr. 3, 2006, incorporated by reference herein.

BACKGROUND OF THE INVENTION

The present invention relates generally to frequency offset compensation, and more particularly to frequency offset compensation in an ultrawideband receiver.

Communication systems often pass information from a transmitter to a receiver in a manner that makes use of a periodic signal. The periodic signal in many cases is not commonly shared between the transmitter and the receiver, such as by being provided to the receiver by the transmitter. Instead the transmitter and the receiver each generate their own periodic signal at appropriate frequencies.

Generally the periodic signals are based on a relatively low frequency signal from a single oscillator, such as crystal oscillator, an LC tank oscillator, a ring oscillator or some other oscillator, and the relatively low frequency signal is multiplied to a frequency or frequencies of interest. Unfortunately, oscillator output very often include variations between oscillators due to manufacturing and temperature variations, such that the frequency of an output oscillation signal may vary slightly from oscillator to oscillator.

Differences between oscillation frequencies of transmitters and receivers generally appears as phase shift or clock skew at the receiver. This phase shift may result in the receiver being unable to correctly determine values for received data. For example, for signals which encode multiple bits per symbol period, both amplitude of the signal and phase of the signal are often used to determine the encoded bits. Phase shift in such a received signal may result in an improper decoding of the bits. Similarly, phase shift of received signals which are encoded and decoded in the frequency domain may also result in phase rotation of signals transformed to the frequency domain, again resulting in an improper decoding of bits.

In many cases, a receiver may receive transmissions from multiple transmitters, each of which include their own oscillator, and these oscillators may be operating at slightly different frequencies. The receiver, therefore, over time may receive transmissions from many transmitters, and all of the transmissions may be phase-shifted with respect to each other. Thus, a receiver may receive transmissions that are not only phase-shifted, but phase sifted in different amounts depending on the transmitter providing the transmissions.

In addition, some communication systems may use a very wide band of the frequency spectrum. Frequency offset may vary for different frequency subbands for such systems and within frequency subbands. Moreover, the transmitters may operate in a bursty fashion, for example providing data in relatively short bursts followed by potentially lengthy periods of inactivity, imposing tight timing requirements on accounting for frequency offset.

SUMMARY OF THE INVENTION

Aspects of the present invention provide a system and a method of frequency offset estimation and compensation for UWB communications. One aspect of the invention estimates an initial frequency offset, uses the initial frequency offset estimation to correct for subsequent frequency offset, and updates the offset estimate that is used for frequency offset correction. Another aspect of the present invention corrects the frequency offset per subcarrier in an ultrawideband communication system, adjusting each subcarrier's frequency by a subcarrier-specific factor. These and other aspects of the invention may also be used other types of communications methods and systems. One aspect of the invention utilizes estimates obtained in the time domain as initial estimates of frequency offset and updates the initial estimates utilizing further estimates of the frequency offset obtained from frequency domain processing. One aspect of the invention utilizes estimates obtained from symbols in the preamble of a packet to compensate for frequency offset in preamble symbols and estimates obtained from symbols in the payload to compensate for frequency offset in the payload.

In one aspect, a receiver performs initial frequency offset estimation, frequency offset compensation, and frequency offset update tracking. The receiver of the embodiments of the invention estimates an initial frequency offset during preamble transmission, compensates the phase rotation per subcarrier based on the initial frequency estimate by performing complex multiplications after the FFT at the receiver, and improves the initial frequency offset estimate over the duration of the packet by measuring the residual phase rotation after frequency offset compensation, to fine-tune/refine the initial frequency offset estimate. After each update, the receiver compensates the phase rotation per subcarrier based on an updated and current frequency estimate.

Another aspect provides a method for frequency offset correction including frequency offset estimation, frequency offset compensation, and frequency offset update tracking. The initial frequency offset estimation may include estimating an initial frequency offset during preamble transmission. The frequency offset compensation may include compensating the phase rotation per subcarrier based on the initial frequency offset estimate by performing complex multiplications after the FFT at the receiver. The initial frequency offset estimate might still be inaccurate after preamble transmission and the frequency offset update tracking may include improving the initial frequency offset estimate over the duration of the packet by measuring the residual phase rotation after frequency offset compensation, to fine-tune/refine the initial frequency offset estimate. The frequency offset compensation may include compensating the phase rotation per subcarrier based on an updated and current frequency offset estimate by performing complex multiplications after the FFT at the receiver.

These and other aspects of the invention are more fully comprehended upon consideration of this disclosure.

BRIEF DESCRIPTION OF THE DRAWINGS

FIGS. 8*a-e* are a visualization of the initial frequency offset estimation vector in accordance with aspects of the invention.

DETAILED DESCRIPTION

Figure 1:
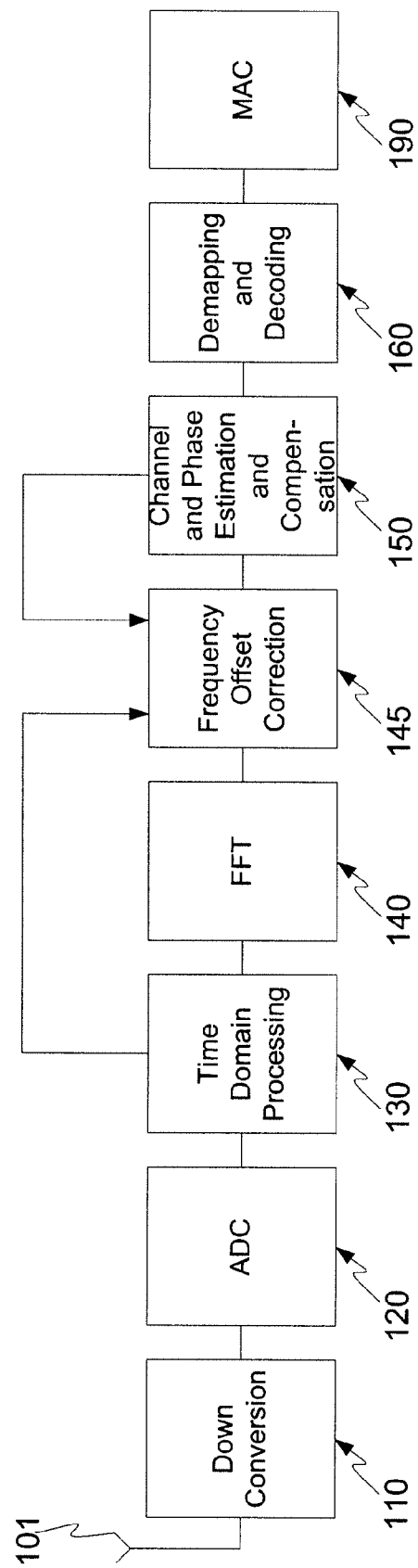
FIG. 1 is a block diagram of a receiver in accordance with aspects of the invention.

FIG. 1 is a block diagram of a receiver in accordance with aspects of the invention. The receiver of FIG. 1, for example, may be used in an ultrawideband communication system making use of OFDM symbols. The receiver includes an antenna 101 for receiving signals and a number of processing blocks for and processing received signals. As illustrated in FIG. 1, the processing blocks include an amplification and down conversion block 110, an analog to digital conversion block 120, a time domain processing block 130, a Fast Fourier Transform (FFT) block 140, a frequency offset correction block 145, a channel and phase estimation and compensation block 150, and a remapping and decoding block 160. Also shown in FIG. 1 is a media access controller (MAC) 190, which often is not considered part of the receiver, but is nevertheless shown in FIG. 1 to illustrate a downstream recipient of signals received and processed by the receiver. The various blocks of the receiver are shown as 110, 120, 130, 140, 150, 160, 190 coupled in series, with the output of one generally provided as an input to the next block.

The amplification and down conversion block 110 includes circuitry to amplify a received signal, using a transimpedance amplifier for example, and circuitry to down convert the amplified signal to baseband, generally using mixer circuits. In addition, the amplification and down conversion block generally includes further amplification circuits to amplify the down converted signal. In most embodiments the receiver is configured to receive and down convert signals over a wide band frequencies, such as may be found in ultrawideband communication systems, for example as specified in "*Multi-band OFDM Physical Layer Specification*", WiMedia Alliance specification document, version 1.1, May 26, 2005, and "*High Rate Ultra Wideband PHY and MAC Standard*", ECMA-368, the contents of both of which are incorporated by reference herein. The analog to digital conversion block 120 includes analog to digital conversion circuitry, which is used to convert the baseband signal to a digital signal. The time domain processing block 130 includes circuitry for performing packet detection, frame synchronization, and automatic gain control functions. The time domain processing block also includes circuitry for determining an initial frequency offset estimate. In most embodiments cross-correlation and auto-correlation circuitry are used to determine phase offset based on known sequences in the packet. An initial estimate of the frequency offset is provided to the frequency offset correction block. The FFT block 140 includes circuitry configured to transform the signal from the time domain to the frequency domain. Thereafter, processing enters the frequency domain, with the prior processing being in the time domain.

The frequency offset correction block 145 follows the FFT block 140 and includes circuitry to perform frequency offset correction for the frequency domain signal provided by the FFT block. In most embodiments the circuitry is configured multiply the FFT output by a phase rotation factor, with different phase rotation factors applied to signals down converted from different carrier or subcarrier frequencies. The frequency offset correction block 145 receives an initial frequency offset estimate from the time domain processing block 130 and a feedback for updating the frequency offset estimate from the channel and phase estimation and compensation block 150. As observed from the position of the FFT block 140, the time domain processing block 130 operates in the time domain and provides a time domain measure of the frequency offset to the frequency offset correction block 145. The channel and phase estimation and compensation block 150 operates in the frequency domain and provides frequency domain feedbacks to the frequency offset correction block 145.

After the frequency offset correction block 145, the processing chain continues with the channel and phase estimation and compensation block 150. The channel and phase estimation compensation block includes circuitry for performing channel estimation and circuitry for performing phase estimation. Results of the channel and phase estimation and compensation block 150 are also used to compensate for multipart fading channels and phase/frequency offset. Phase estimation or tracking uses embedded pilot tones in the packet to estimate the phase offset. Estimates of the phase offset are provided to the frequency offset correction block 145 to update the initial measure of frequency and to further update the subsequent measures.

Phase estimation or tracking is followed by remapping, deinterleaving and decoding at the demapping and decoding block 160. The demapping and decoding block includes circuitry for demapping, for example using schemes such as quadrature phase shift keying (QPSK), dual carrier modulation (DCM), or 16 quadrature amplitude modulation (16 QAM). The demapping and decoding block also includes circuitry for performing decoding, such as Viterbi decoding.

Figure 2:
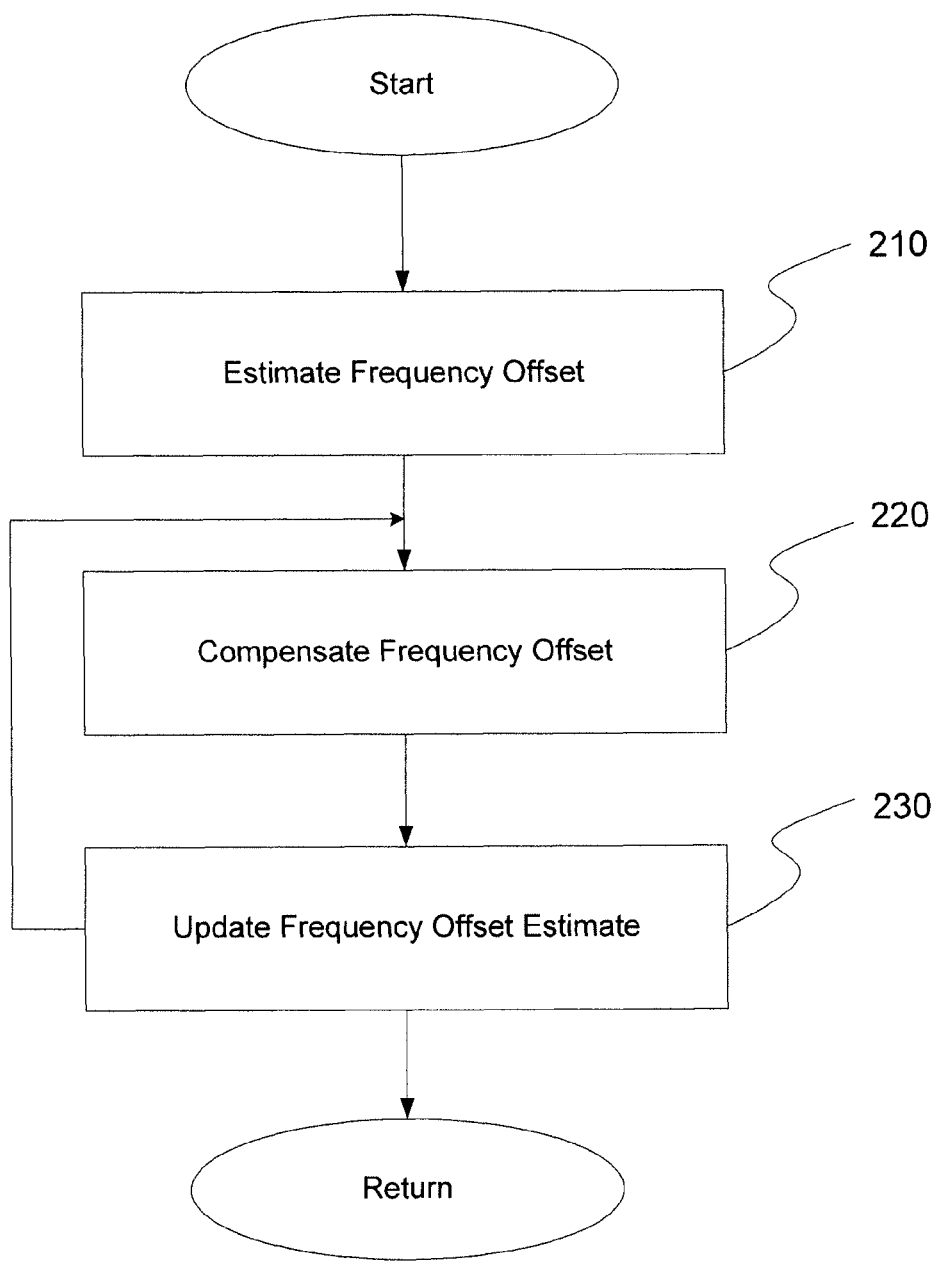
FIG. 2 is a flow diagram of a process for frequency offset correction, in accordance with aspects of the invention.

FIG. 2 is a flow diagram of a process for frequency offset correction in accordance with aspects of the invention. In some embodiments, the process of FIG. 2 may be performed by the frequency offset correction block 145 of FIG. 1, in conjunction with the time domain processing block 130 and the channel and phase estimation block 150 in many embodiments. In various embodiments, however, frequency offset correction functions are not performed in a separate block, but are instead performed in the block performing phase estimation.

The process estimates frequency offset in block 210. In some embodiments, estimating frequency offset in block 210 includes obtaining an initial estimate of frequency offset in the time domain. In some embodiments frequency offset is estimated by determining phase shift of a received signal compared with an expected signal. For example, a packet preamble may include a predefined pattern, and the process in block 210 may perform a comparison of a received signal with the predetermined pattern to determine phase shift. In many embodiments, the predetermined pattern repeats over time, and a cross-correlation is performed on the received signal and the predetermined pattern to locate the predetermined pattern, and an auto-correlation is performed on the cross-correlation to determine phase shift of the predetermined pattern over time. For received signals separated into I and Q components, angle of the auto-correlation is representative of the phase offset, and of the frequency offset with knowledge of nominal frequency.

In many embodiments frequency offset compensation is performed for systems receiving transmissions at many different frequencies, for example many different subcarriers. Accordingly, estimating frequency offset 210 in some embodiments includes determining an initial frequency offset estimate for a particular frequency and then determining an initial frequency offset estimate for each subcarrier based on the initial frequency offset estimate and differences in the particular frequency and frequency of each subcarrier. In most embodiments, however, per subcarrier frequency offset estimates are performed during frequency offset compensation in block 220.

The process compensates for frequency offset in block 220. Frequency offset compensation 220 is performed by complex multiplication in the frequency domain after the signal has been transformed from the time domain to the frequency domain. Accordingly, for frequency offset compensation 220, each subcarrier is multiplied by a frequency offset factor in order to undo the frequency offset introduced per each separate subcarrier.

The process updates the frequency offset estimate in block 230. In block 230, the frequency offset estimate is, in most embodiments, updated from pilot tone based phase estimates of the symbols in the frequency domain, and a corresponding updated value is obtained for each subcarrier.

Updating of the frequency offset estimate in block 230 and frequency offset correction or compensation in block 220 are repeated for the duration of the signal or a portion of the signal. At an end of the signal or the predetermined portion of the signal, the process returns.

In many embodiments, the operations of the process of FIG. 2 are used for packet based multi-sub-carrier communication systems. Accordingly, in some embodiments when a packet is received, during the estimating of frequency offset 210, an initial frequency offset factor is estimated from symbols in the preamble of the packet. This initial frequency offset factor is used to estimate an initial frequency offset for each subcarrier of each symbol. In block 220, the initial frequency offset estimate is used to compensate for frequency offset in the symbols of the preamble following the symbols used for the initial offset estimation of block 210. As discussed above, frequency offset in the time domain transforms to phase offset, or rotation, in the frequency domain. Each subcarrier is rotated from its intended position due to frequency offset. The compensation of block 220 is achieved in most embodiments by complex multiplication in the frequency domain that derotates each subcarrier.

The payload of a packet may be divided into a header followed by a data portion, although at times the header may be considered part of the preamble by some. The updating of the frequency offset estimate in block 230 is performed during the header and data portion of the packet. The initial frequency offset factor is updated, periodically or upon the occurrence of a specified event, and the updated factor is used to update the subsequent frequency offset estimates that are used for offset compensation. After the symbols have undergone transformation into the frequency domain, the phase offset of pilot subcarriers, in view of channel estimates, may be used to determine residual phase offset for use in updating estimated frequency offset. The estimated frequency offset may be updated after a predefined n symbols, after the phase offset estimate crosses pi or negative pi, or at other times. The updated factor is used to estimate a subcarrier-specific frequency offset that is in turn used to compensate for frequency offset in the symbols following the preamble.

Figure 5:
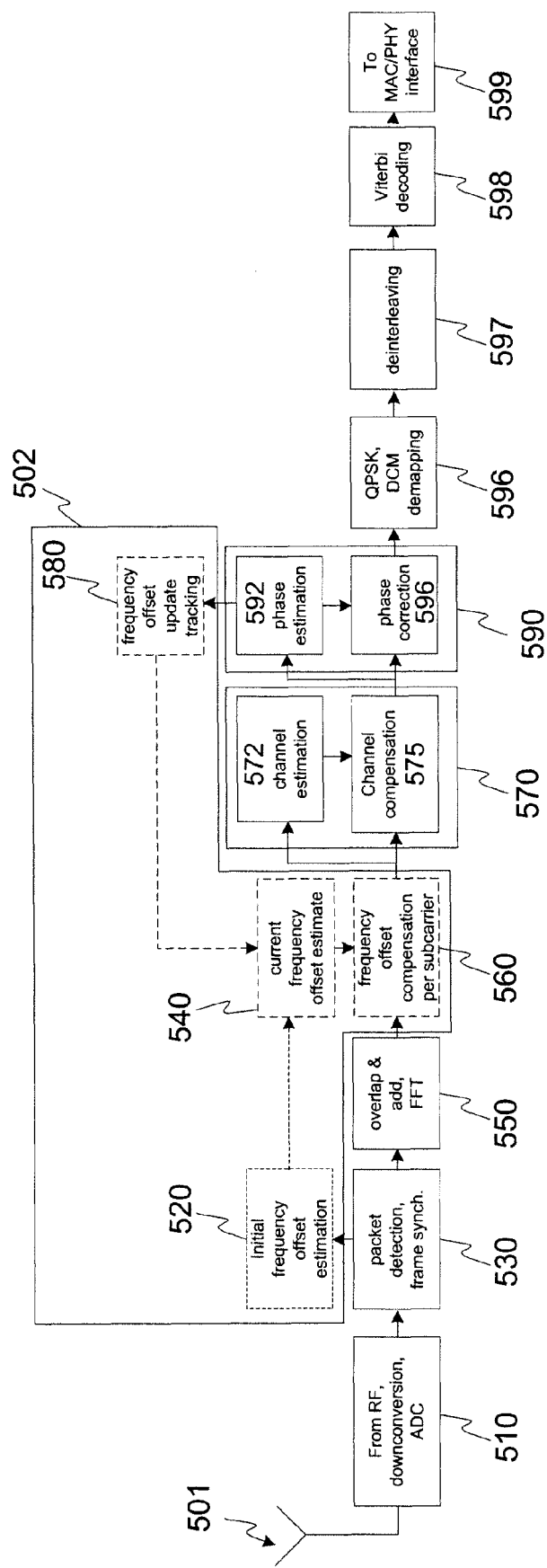
FIG. 5 is a further block diagram of a receiver, according to aspects of the invention.

Moving forward to FIG. 5, FIG. 5 is a block diagram of a receiver according to aspects of the invention. The receiver includes blocks involved in frequency offset estimation, compensation and tracking. The receiver includes a number of blocks that process a received signal substantially in a serial manner. A receive antenna 501 receives the RF signal. A downconversion and analog to digital conversion block 510 downconverts the signal from radio frequency to base band and converts it from analog to digital format for digital baseband processing. The downconversion and analog to digital conversion block is followed by a packet detection and frame synchronization block 530 that uses a known packet synchronization sequence in the packet to find the beginning of the packet. An overlap and add and FFT block 550 follows the packet detection and frame synchronization block. The FFT block 550 transforms the signal from time domain to frequency domain. A frequency offset estimation and compensation block 502 follows the FFT block 550 and is discussed in further detail below.

A channel estimation and compensation block 570, and a phase estimation and correction block 590 follow the frequency offset estimation and compensation block 502. The channel estimation and compensation block 570 includes a channel estimation block 572 and a channel compensation block 575. The phase estimation and correction block 590 includes a phase estimation block 592 and a phase correction block 595. These blocks 570, 590 use symbols or pilot tunes in the signal to estimate the channel parameters and to estimate the phase of the signal. The channel compensation block 575 is coupled to the channel estimation block 572 that provides an estimate of the channel to the channel compensation block 575. Both the channel estimation and the channel compensation blocks 572, 575 receive the same signal from the FFT block 550. Similarly, the phase correction block 595 is coupled to the phase estimation block 592 that provides an estimate of the phase to the phase correction block 595. Both the phase estimation and the phase compensation blocks 592, 595 receive the same signal from the channel estimation and compensation block 570. The estimation blocks 572, 592 receive the output of the previous block and provide an estimate of respectively the channel and the phase to their corresponding compensation blocks 575, 595.

A demapping block 596, a deinterleaving block 597, and a decoding block 598 are also coupled in series and receive the output of the phase estimation and correction block 590. Demapping may use QPSK or DCM and decoding may use the Viterbi algorithm. The product of decoding block 598 is provided to a MAC interface 599.

The frequency offset estimation and compensation block 502 includes an initial frequency offset estimation block 520, a current frequency offset estimation block 540, a frequency offset compensation block 560, and a frequency offset update tracking block 580. The initial frequency offset estimation block 520 and the frequency offset update tracking block 580 provide measures of frequency offset to the current frequency offset estimate block 540. The current frequency offset estimate block uses the measure of frequency offset provided and produces frequency offset estimates for each subcarrier of the signal. The frequency offset compensation block 560 uses the subcarrier-specific estimates of frequency offset provided by the current frequency offset estimate block 540 to compensate for frequency offset in the symbols being received.

The internal blocks of the frequency offset estimation and compensation block 502 are coupled together and to the other receiver blocks such that the two estimation blocks receive inputs from different points along the serial chain of processing and provide their estimate of frequency offset to the compensation block that is located within the serial chain of processing with the other receiver block. The initial frequency offset estimation block 520 receives an input from the packet detection and frame synchronization block 530 and provides its output to the current frequency offset estimation block 540. The current frequency offset estimation block 540 provides an input to the frequency offset compensation block 560. The frequency offset update tracking block 580 receives an input from the phase estimation block 592 of the receiver and provides an updated estimate of the frequency offset to the current frequency offset estimation block 540. The frequency offset compensation block 560 that receives the output of the current frequency offset estimate block 540 is located in the chain of serial processing between the FFT block 550 and the channel estimation and compensation block 570 of the receiver.

The number and organization of the internal blocks of the estimation and compensation block 502 may vary in different embodiments. For example, an alternative embodiment may do away with the current frequency offset estimate block 540 and the initial estimation block 520 and the update tracking block 580 may provide the subcarrier-specific estimates of frequency offset to the compensation block 560.

In one embodiment, time domain data is used for a portion of frequency offset estimation and frequency domain data is used for another portion. After a signal received by the receiver has gone through packet detection and frame synchronization 530, it is provided both to the following FFT block 550 and to the initial offset estimation block 520. The initial frequency offset estimate is provided to the frequency offset compensation block 560 through the current frequency offset estimation block 540. The compensation block 560 uses the initial estimate to compensate the frequency offset of the signal that is now in the frequency domain because it has gone through the FFT block 550. This compensation is performed by complex multiplication of each of the signal subcarriers by a compensating factor. The initial estimate of the frequency offset that is provided by the initial frequency offset estimation block 520 from the time domain data, is updated by the current frequency offset estimation block 540 using the updated estimate from update tracking block 580. The update tracking block 580 receives a current phase estimate of the signal that is now in the frequency domain and updates the frequency offset estimate.

In one embodiment, the subcarrier-specific nature of frequency offset estimation, yields more accurate compensation for UWB communication where a larger number of subcarriers are used to cover a wider band of frequency. The frequency offset estimation and compensation block 502 provides subcarrier-specific compensation factors appropriate for UWB.

In one embodiment, the initial frequency offset estimation block 520 arrives at an estimate of frequency offset from symbols in the preamble and the initial estimate is used for frequency offset compensation of other symbols in the preamble. The subsequent updates by the frequency offset update tracking block 580 arrive at updated estimates of frequency offset from symbols in the payload. The updated estimate is used for frequency offset compensation of later symbols of the payload.

To demonstrate one exemplary embodiment, a correspondence between a packet structure and different stages of frequency offset estimation, compensation and tracking, according to aspects of the invention may be established. The packet structure of FIG. 3, is used together with the receiver block diagram of FIG. 5 and the flow chart of FIG. 2 to describe an exemplary method and an exemplary system for frequency offset correction, including estimation and compensation, according to aspects of the invention.

Figure 3:
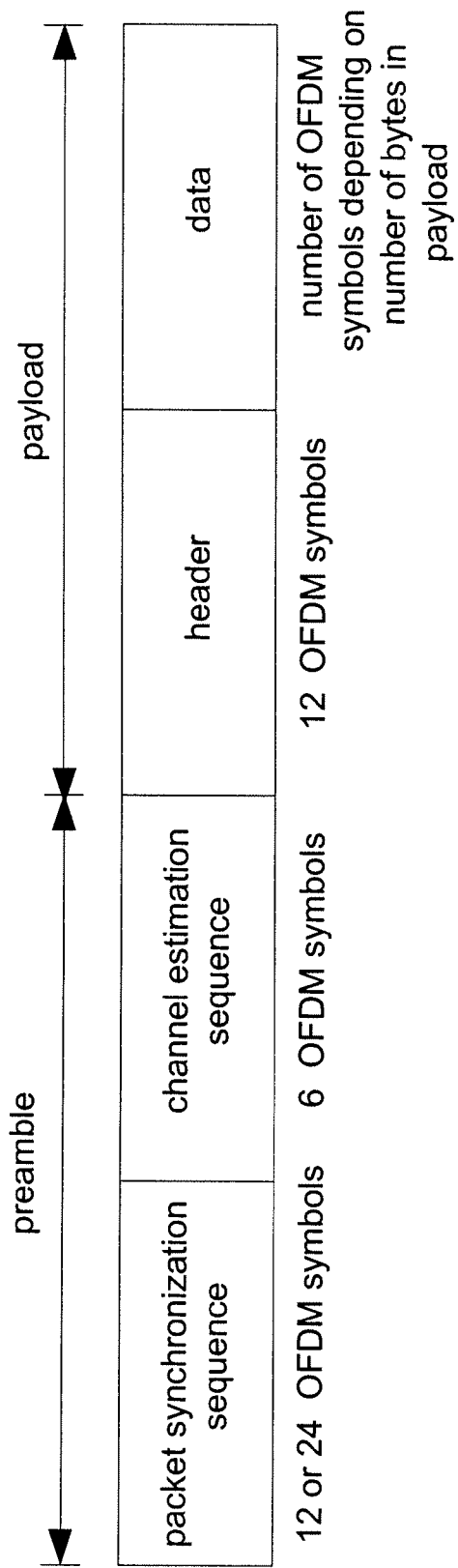
FIG. 3 shows an exemplary packet format, used for example in Orthogonal Frequency Division Multiplexing (OFDM) communications.

FIG. 3 shows an exemplary packet format, used for example in OFDM communications. The OFDM symbols may be transmitted in packets that include a number of symbols and FIG. 3 shows one such exemplary packet The exemplary packet shown in FIG. 3, includes a preamble followed by a payload. The preamble includes 24 packet synchronization symbols and 6 channel estimation symbols. The payload includes 12 header symbols (which are sometimes considered part of the preamble) followed by the data symbols. An alternative packet format may include a short preamble that has 12 OFDM symbols. The short preamble may be used for packets that are part of a burst of packets while a packet that has a long preamble is used as the first packet of the burst.

An initial frequency offset factor $f_{off,init}$ is estimated from the last 6 of the packet synchronization symbols of the preamble. The preamble, that is shown, is long and includes 24 packet synchronization symbols. A short preamble includes 12 packet synchronization symbols. The initial frequency offset factor $f_{off,init}$ is obtained in the time domain and before the received symbols in the packet have undergone transformation from the time domain to the frequency domain.

With respect to the receiver of FIG. 5, the initial frequency offset factor $f_{off,init}$ is obtained by the initial frequency offset estimation block 520 that is receiving the symbols after packet detection and frame synchronization in the corresponding block 530.

After the packet synchronization symbols, during reception of the 6 channel estimation symbols, frequency offset compensation is performed in the frequency domain. Frequency offset compensation is performed on outputs of a transformation that transforms the time domain symbols into frequency domain. As explained above, frequency offsets in the time domain appear as phase rotations in the frequency domain. Complex multiplications are used on the frequency domain symbols to de-rotate the phase rotation, that was induced by the frequency offset, per each subcarrier of the symbol. Complex derotating vectors based on the initial frequency offset factor $f_{off,init}$ are obtained and used to perform the frequency offset compensation separately for each subcarrier.

So, after the packet synchronization symbols and still during the preamble, frequency offset compensation is performed using derotating vectors based on the initial frequency offset factor $f_{off,init}$.

With respect to the receiver of FIG. 5, the initial frequency offset factor $f_{off,init}$ that has been obtained by the initial estimation block 520 is provided to the current frequency offset estimation block 540. At this time, the current estimation block 540 has not received anything from the update tracking block 580 yet. So, the current frequency offset estimation block 540 provides derotating vectors that are based on the initial frequency offset factor $f_{off,init}$ to the frequency offset compensation block 560. The initial frequency offset factor $f_{off,init}$ has the same value for all of the subcarriers. So, the frequency offset compensation block adjusts the initial frequency offset factor $f_{off,init}$ for each subcarrier to obtain an offset compensation value for the particular subcarrier.

After the preamble, and beginning with the reception of the first header symbol, frequency offset update tracking is started. The update tracking seeks to improve the accuracy of the initial frequency offset factor $f_{off,init}$ over the duration of the packet, using a residual phase estimate obtained from pilot signals embedded in the header and data portion of the packet. Under one standard, 12 pilot signals are placed on 12 subcarriers and are embedded in each OFDM symbol after the preamble. Under different standards, a different number of pilot subcarriers may be embedded. The updated offset factor is denoted $f_{off}$. The updated offset factor $f_{off}$ is used to obtain an updated frequency offset estimate that is adjusted for each subcarrier.

So, during the header and data part, the most recently updated frequency offset factor $f_{off}$ is used for frequency offset compensation.

With respect to the receiver of FIG. 5, the update tracking block 580 receives a measure of the phase of the samples in the symbol from the phase estimation block 595. The update tracking block 580 provides a correction factor to the current frequency offset estimation block 540. The current estimation block 540 uses the correction factor to update a previous value of the frequency offset factor $f_{off}$. The correction factor depends on the tangent of the phase which reaches its maximum and minimum at pi and −pi. Therefore, the update tracking block 580 may start over every time the phase estimate being provided by the phase estimation block 595 wraps around pi or −pi. Alternatively, the update tracking block 580 may start over after a predefined number of symbols.

Other embodiments of the method shown in FIG. 2 may vary according to frequency hopping patterns and configuration of the receiver, for example, inclusion of multiple receive antennas.

Figure 6:
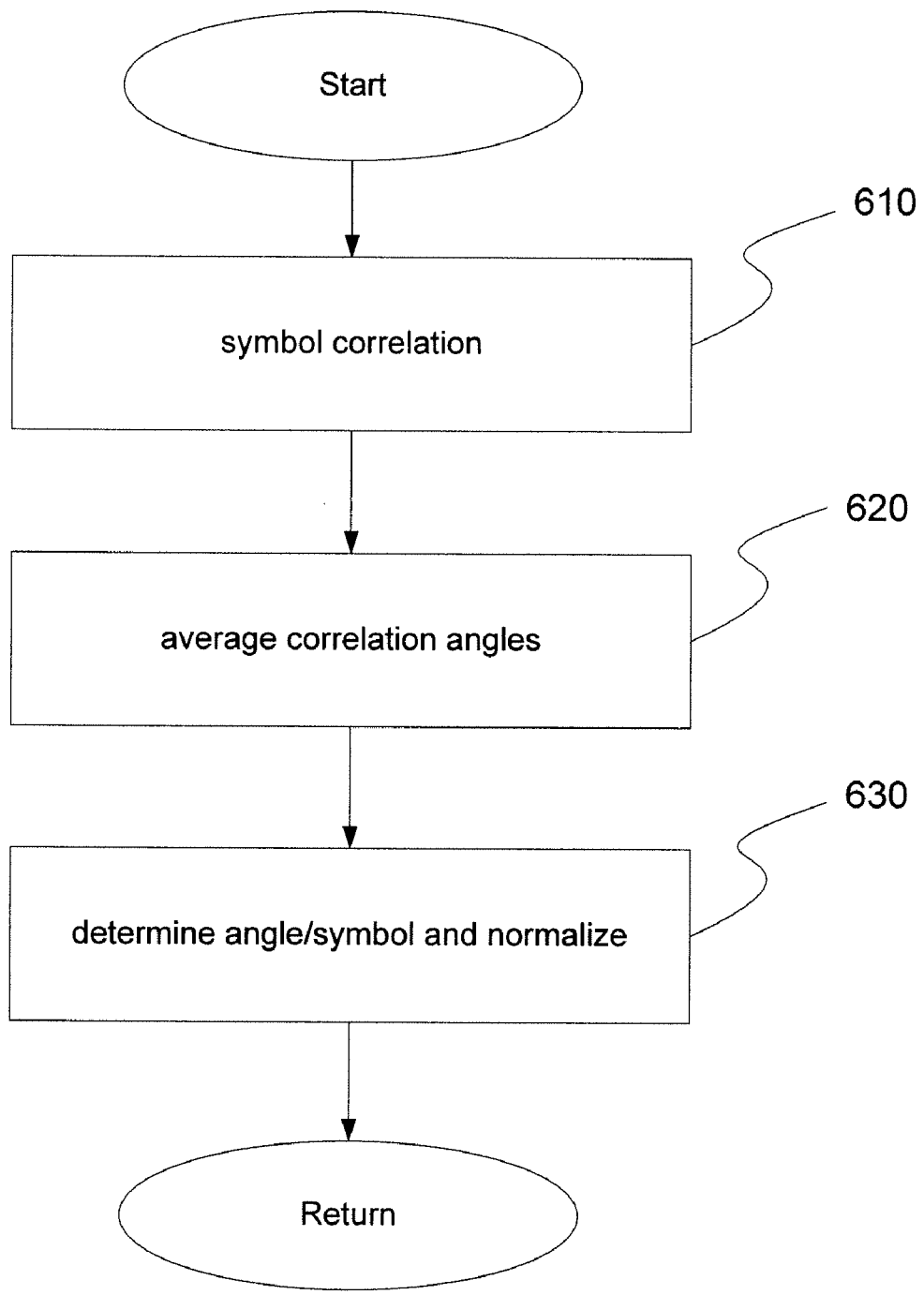
FIG. 6 is a flow diagram of a process for initial frequency offset estimation in accordance with aspects of the invention.

FIG. 6 is a flow diagram of a process for initial frequency offset estimation, according to aspects of the invention. The process correlates symbols of a received packet in block 610, averages correlation angles in block 620, determines angle offset per symbol in block 630, and accounts for use of a particular frequency and period in block 640. The process includes correlating symbols of a received packet and the packet synchronization sequence of the packet in block 610, to determine how well the symbols agree with the known synchronization sequence and how much the symbols are changing from one symbol to the next as a result of frequency offset that is impacting the signal. The process returns at the end of the packet, and may repeat for a following packet.

In one embodiment, symbol correlation block 610 includes cross-correlating received samples of symbols with the known packet synchronization symbols to locate packet symbols. For at least some UWB transmissions the packet synchronization symbols may be determined from a time frequency code (TFC) number (further discussed later), which is provided by the MAC. In addition, it should be noted the sign of the packet synchronization symbols in some UWB schemes is modulated by a cover sequence, a sequence of +1 and −1, which depends on the TFC number. Before computing the autocorrelations, the modulation of the cover sequence is removed from the cross-correlation results by multiplying them with the respective value of +1, −1.

The cross-correlation results are auto-correlated. For packet synchronization symbols which repeat every symbol, the auto-correlation may be computed as $cc\_ac(n)=cc(n-1)*cc(n).$ Preferably the auto-correlation is performed for peaks, or maximum magnitudes, of cross-correlation results, and preferably the auto-correlation is performed over a window of samples about that peak, which reduces the effect of noise on the cross correlation result. In one embodiment the window is 16 samples at a sampling frequency of 528 mega samples per second.

The results of the autocorrelation may be represented as complex vectors having a magnitude and an angle. The angle of the autocorrelation vector, such as cc_ac_peak(n), indicating auto-correlation of cross-correlation peaks, is a measure of how much the phase has rotated between the current symbol and the delayed symbol. Angles of autocorrelation values show rotation in the frequency domain or frequency offset in the time domain.

Some embodiments of the invention account for frequency hoping over time of received symbols. For example, some systems, such as at least one UWB system, utilize frequency hopping access a wide range of frequencies. For example, UWB systems may use frequencies between 3.1-10.6 GHz. This frequency range is subdivided into 5 band groups. Initial UWB devices operate in band group 1 that ranges from 3.168 GHz to 4.752 GHz. The band group 1 is itself subdivided into the three subbands of 528 MHz bandwidth each. Each OFDM symbol is transmitted on a different frequency subband according to a Time-Frequency Code (TFC) hopping pattern. Table 1 shows examples of TFCs for band group 1 of a UWB communication system.

In Table 1, the leftmost column shows the TFC numbers or TFC logical channels ranging from 1 to 7. Subsequent columns show the frequency subbands used for transmission during each normalized time kk for kk=0 through kk=5. Each normalized time corresponds to one OFDM symbol that is transmitted during one subband. The longest hopping period for each of the seven TFC schemes shown in Table 1 is, therefore, six OFDM symbols.

| TFC number | time | | | | | |
|---|---|---|---|---|---|---|
| | kk = 0 subband number | kk = 1 subband number | kk = 2 subband number | kk = 3 subband number | kk = 4 subband number | kk = 5 subband number |
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |

Figure 4:
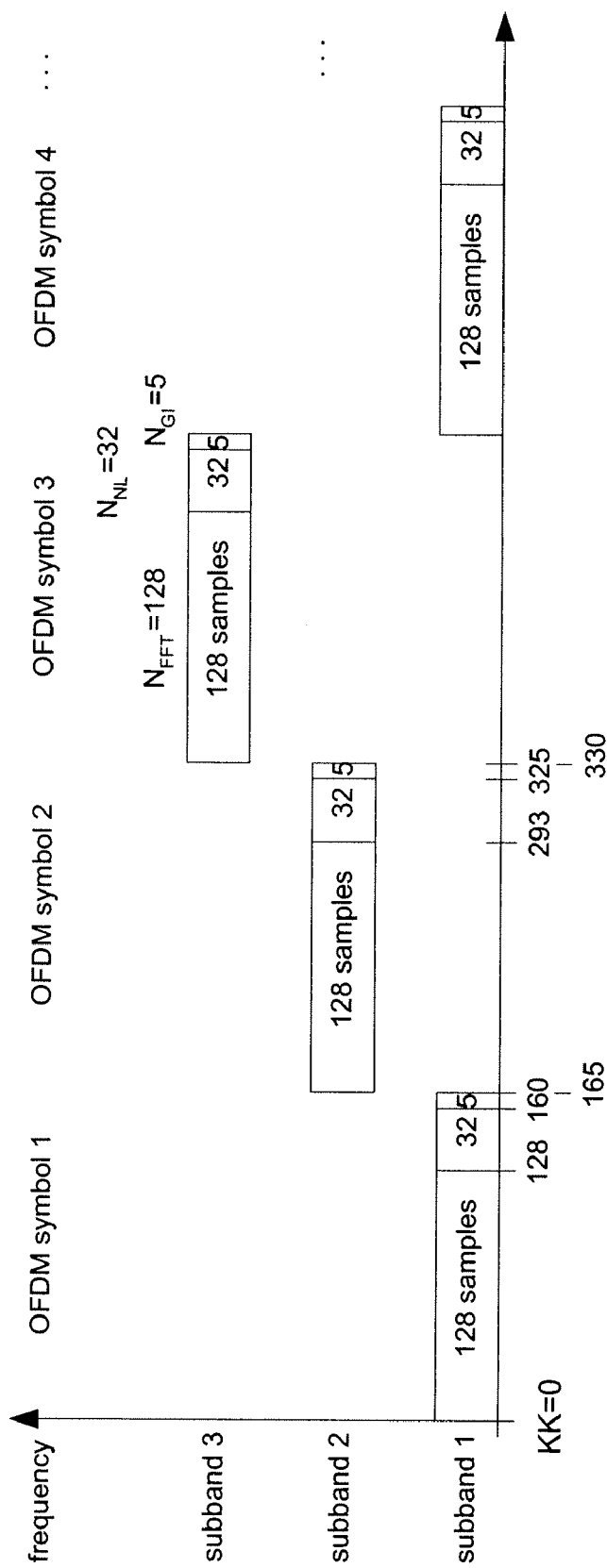
FIG. 4 shows an OFDM symbol structure and frequency subband hopping for UWB.

For example, FIG. 4 shows OFDM symbols that correspond to the TFC hopping pattern of 2 shown in Table 1. The exemplary symbol structure shown for UWB communications includes 128 samples of the symbol followed by a null prefix (NL) and a guard interval (GI) for a total of 165 samples per symbol. Each symbol is transmitted on a different frequency subband. The OFDM symbols shown in FIG. 4, hop from frequency subband 3 to 2 to 1 and then back to the frequency subband 3. For TFC numbers 5, 6 and 7, all the OFDM symbols are transmitted on the same frequency subband.

Thus, in one embodiment, a delay of D=6 symbols is used, which coincides with the period of the exemplary frequency hopping pattern being used for demonstration of the method. The choice of 6 symbols provides that the autocorrelation is performed between symbols that belong to the same frequency subband no matter which TFC is being followed. Accordingly, preferably the delay for calculating the autocorrelation vectors is selected to coincide with the period of the frequency hopping pattern of the symbols, to ease processing by ensuring that the autocorrelation is performed between symbols that belong to the same frequency subband. Accordingly, for symbol n, the autocorrelation is computed as an autocorrelation between peak cross correlation values cc_peak:

$$cc\_ac\_peak(n)=cc\_peak(n-6)*cc\_peak(n).$$

Figure 7:
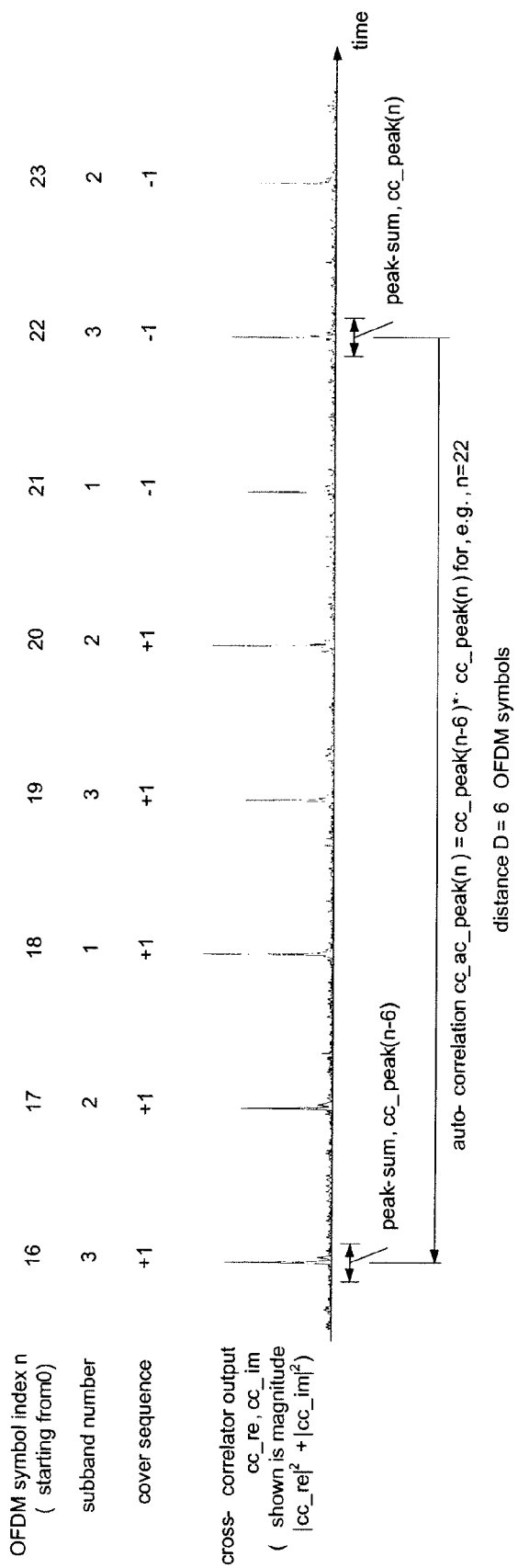
FIG. 7 shows an overview of signals involved in computing an initial frequency offset estimate in accordance with aspects of the invention.

FIG. 7 shows the last 6 symbols of the packet synchronization symbols of the preamble of a packet including symbols n=0 to n=24. With the first symbol out of the first 24 symbols being denoted as n=0, the last 6 symbols correspond to n=18 to n=23. The last 6 symbols are used in obtaining an initial estimate of the frequency offset. For example, for n=18, the autocorrelation is computed as cc_ac_peak(18)=cc_peak (18−6)*cc_peak(18) and for n=23 the autocorrelation is computed as cc_ac_peak(23)=cc_peak(23−6)*cc_peak(23). FIG. 7 is exemplary and shows a portion of a packet with a long preamble. More particularly, FIG. 7 shows the exemplary case of n=22 and n−6=16 and shows that the autocorrelation for the 22nd symbol of the preamble is calculated as cc_ac_peak(22)=cc_peak(16)*cc_peak(22). A packet with a short preamble including 12 OFDM symbols may be used alternatively, in which case the symbols corresponding to n=7 to n=12 would be used to obtain an initial estimate of the frequency offset.

The process averages a number of correlation results vectors in block 620. To reduce noise on the estimate, 6 autocorrelation vectors are summed to obtain the average initial frequency offset estimation vector foff_vec. As an example, the averaged frequency offset estimation vector foff_vec is obtained by adding six autocorrelation vectors corresponding to the 18th to the 23rd packet synchronization sample of the symbol.

Thus, the initial frequency offset estimation vector foff_vec, is obtained from the following relationship which presents a summation over n=18 to n=23 of the autocorrelation vectors for the $18^{th}$ to the $23^{rd}$ symbol of the packet:

$$\text{foff\_vec} = \sum_{n=18}^{23} cc\_ac\_peak(n).$$

The initial frequency offset estimation vector foff_vec, in this example, is a sum over 6 complex autocorrelation results cc_ac_peak corresponding to the last 6 OFDM symbols of the packet synchronization symbols, n=18, 19, 20, 21, 22, 23.

FIGS. 8*a-e* present a vector visualization of the complex autocorrelation results cc_ac_peak. FIGS. 8*c-e* show the complex autocorrelation vectors cc_ac_peak of each subband of each of the TFC patterns 1 to 7. The vectors contributions are shown with respect to the center frequency of frequency subband 2 for TFC patterns of 1, 2, 3 and 4. As shown in FIGS. 8*a-d*, for example, use of the center frequency subband for determining auto correlation vectors allows for effective cancellation of angle effects due to the lower and higher frequencies of the other subbands. For TFC patterns 5, 6 and 7, the vector contribution of each frequency subband is shown with respect to the center frequency of its corresponding subband. For example, TFC 5 corresponds to a hopping pattern that stays in frequency subband 1 throughout the transmission. The vector contribution of each of the 6 frequency subbands is shown with respect to the center frequency of subband 1. As a result, for TFC 5, 6 and 7 all of the autocorrelation vectors shown are substantially aligned.

From the averaged frequency offset estimation vector foff_vec, the initial frequency offset factor may be computed in block 630 as:

$$f_{off,init}=\{\arc\tan(\text{foff\_vec})/(6*T_{SYMBOL})\}*\{1/f_{center}\}=\arc\tan(\text{foff\_vec})/6/T_{SYMBOL}\cdot 1/f_{center}$$

The above equation presents an initial frequency offset estimate $f_{off,init}$, which may be considered as in units of ppm. In the above equation, "arc tan" denotes the arc tangent function for computing an angle from the tangent of the angle. The tangent of the angle of a vector representing a complex number is obtained from the ratio of imaginary part over real part of the complex number. So, arc tan(foff_vec) yields the angle of the complex vector foff vec.

In the above equation, $T_{SYMBOL}$ is the duration of one symbol such as an OFDM symbol. In one exemplary embodiment, $T_{SYMBOL}$=312.5 ns. When the symbol includes 165 subcarriers and covers a frequency subband of 528 MHz, the sampling period $T_s$=1/528 MHz=1.89 ns and the duration of the symbol or the symbol period $T_{SYMBOL}$=165*$T_s$=312.5 ns.

In obtaining the autocorrelation vector cc_ac_peak(n), the cross-correlation vectors cc_peak(n) and cc_peack(n−6) were used. Because a delay or lag of 6 symbols was used, the autocorrelation values thus obtained, reflect the impact of 6 phase offsets. Therefore, the angle of the frequency offset estimation vector, arc tan(foff_vec), is divided by 6 symbol periods, (6*$T_{SYMBOL}$), to obtain phase offset for one symbol.

In the above equation $f_{center}$ is the center frequency of the OFDM frequency subband. The factor $\{1/f_{center}\}$ is included in the equation for $f_{off,init}$ in order to obtain a value that may be a more useful form in application to specific sub carriers. In various embodiments, however, combination of the factors may be used in varying manners to achieve substantially the same results.

The value of the $f_{center}$ depends on the TFC. For TFC numbers 1 to 4 of Table 1, the hopping is among all three subbands, and $f_{center}$ is set to the center frequency of the middle subband. For bandgroup 1 in the UWB system of MBOA that ranges from 3.168 GHz to 4.752 GHz and with OFDM subbands of 528 MHz, the center frequency of the middle subband turns out to be $f_{center}$=3.960 GHz which is obtained from $f_{center}$=3.168 GHz+528 MHz+(528/2)MHz.

For TFC numbers 5, 6 and 7, no frequency hopping is performed and one of the subbands 1, 2 or 3 is used exclusively for transmission/reception. Accordingly, $f_{center}$ is set to the center frequency of the subband being used for the particular TFC. For example, the center frequency is set to the center frequency of subband 1 (3.432 GHz=3.168 GHz+(528/2)MHz.) for TFC 5, the center frequency of subband 2 (3.960 GHz=3.168 GHz+528 MHz+(528/2)MHz.) for TFC 6, and the center frequency of subband 3 (4.488 GHz=3.168 GHz+ 528 MHz+528 MHz+(528/2)MHz) for TFC 7.

If more than one receive antenna is used, then all initial frequency offset estimation vectors foff_vec of all the receive antennas may be summed, and the resulting vector is used to compute the initial frequency offset factor $f_{off,init}$. In most cases all receive RF-chains are driven by the same crystal, and all RF-chains would be expected to have the same frequency offset with respect to the transmitted signal.

Figure 9:
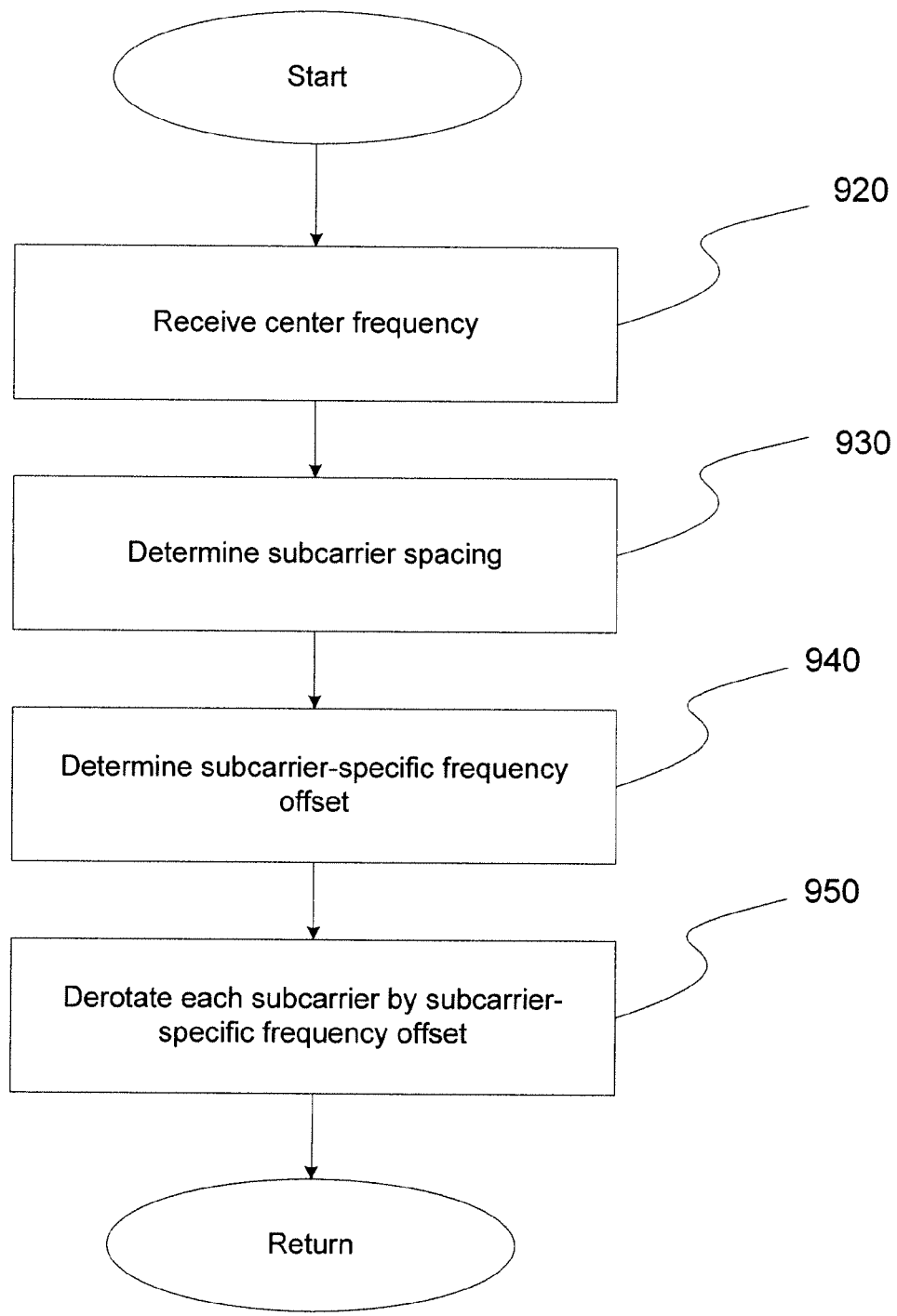
FIG. 9 is a flow diagram of a process for frequency offset compensation in accordance with aspects of the invention.

FIG. 9 is a flow diagram of a process for frequency offset compensation, according to aspects of the invention. The process receives a center frequency in block 920, and determines subcarrier spacing in block 930. The center frequency is the center frequency of a sub-band being compensated. Subcarrier spacing depends on the number of subcarriers that are occupying the frequency band being used and the bandwidth of the frequency band. The distance of each subcarrier from the center determines its frequency location. The process uses the location of the subcarrier and a current value of the frequency offset factor to obtain a subcarrier-specific frequency offset for each subcarrier in block 940. The process derotates each subcarrier by the subcarrier-specific frequency offset in block 950 to compensate the frequency offset associated with the subcarrier. The process afterwards returns.

In one embodiment, the center frequency of the symbol subband in block 920, may be determined from the TFC of the symbol. The subband center frequency, $f_{center}$, changes with subband hopping and may be taken, for example, as $f_{center}=3.960$ GHz for the second subband.

In one embodiment, determining subcarrier spacing between subcarriers may include dividing frequency bandwidth of a subband by the number of subcarriers in the subband. An exemplary subband may include 128 subcarriers spread over 528 MHz. The subcarrier spacing may be, for example, $f_{sub}=4.125$ MHz.

In one embodiment, the frequency location of each subcarrier based on the center frequency of the subcarrier and the subcarrier spacing in block 930 is obtained from $f_{center}+k*f_{sub}$, with $f_{center}$=center frequency of the subband, $f_{sub}$=subband spacing, and k=number of subcarriers per subband.

Similarly, in one embodiment, the subcarrier-specific frequency offset $f_{off,k}$ for each subcarrier in block 940 is obtained from $$f_{off,k}=(f_{center}+k*f_{sub})*f_{off},$$

with $f_{off}$=estimated frequency offset factor, $f_{center}$=center frequency of the subband, $f_{sub}$=subband spacing, and k=number of subcarriers per subband.

For example, an exemplary OFDM symbol may include 128 tones. The subcarriers for the tones may be numbered from −64 to 63 for a total of 128 subcarriers. The frequency offset $f_{off,k}$ for a subcarrier k, when may be given by the equation:

$$f_{off,k}=(f_{center}+k*f_{sub})*f_{off}, \text{ with } k=-64,\ldots,+63$$

In one embodiment, the derotating of each subcarrier by the subcarrier-specific frequency offset in block 950 may be performed by a complex multiplication. The rotated subcarrier is multiplied by the complex conjugate of the rotation vector in order to undo the impact of rotation. For example, the frequency offset $f_{off,k}$ induces a phase rotation of $\exp(+j\ 2\pi\ f_{off,k}\ n\ T_{SYMBOL})$ per each subcarrier, where n is the symbol index and $T_{SYMBOL}$ is the duration of one symbol. In one exemplary embodiment being discussed $T_{SYMBOL}=312.5$ ns. Frequency offset compensation may be accomplished in the frequency domain by multiplying each subcarrier from index −64 to +63 with the complex conjugate of the estimated rotation phase, e.g., by multiplying it with $\exp(-j\ 2\pi\ f_{off,k}\ n\ T_{SYMBOL})$ which causes a derotation of the rotated subcarrier.

The above term can be further separated into a base frequency offset compensation, and a tilt frequency offset compensation.

$$\exp(-j\ 2\pi(f_{center}+k f_{sub})*f_{off,init}\ n\ T_{SYMBOL})=\exp(-j\ 2\pi\ f_{center}\ n\ T_{SYMBOL})*\exp(-j\ 2\pi k f_{sub}\ n\ T_{SYMBOL})=\exp(-j\ 2\pi(f_{off,center}+k.\ f_{off,sub})*n\ T_{SYMBOL})=\exp(-j\ 2\pi f_{off,center}\ n\ T_{SYMBOL})*\exp(-j\ 2\pi\ k.\ f_{off,sub}\ n\ T_{SYMBOL})$$

The first term, $\exp(-j\ 2\pi\ f_{center}\ n\ T_{SYMBOL})$, represents the base offset compensation and the second term, $\exp(-j\ 2\pi\ k.\ f_{sub}\ n\ T_{SYMBOL})$, represents the tilt offset compensation. Accordingly, in some embodiments a first correction factor is applied to account for base frequency offset and a second correction factor is applied to account for tilt frequency offset.

Figure 10:
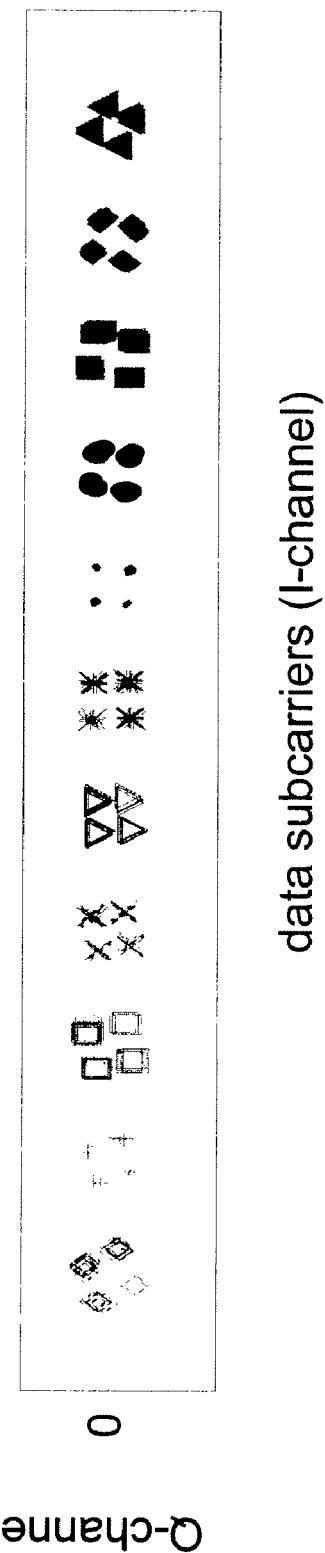
FIG. 10 illustrates frequency offset tilt in frequency domain at output of FFT at a receiver in accordance with aspects of the invention.

The effect of tilt frequency offset is illustrated in FIG. 10. FIG. 10 illustrates frequency offset tilt in frequency domain at output of FFT at a receiver, according to aspects of the invention for 11 subcarriers, from the lowest frequency to the highest frequency.

Owing to the wideband nature of the signal, the difference in frequency offset between lowest subcarrier frequency and highest subcarrier frequency is significant, and thus a difference in rotation speed shows up. Preferably, each subcarrier should be corrected by both base and tilt frequency offset.

If more than one receive antenna is used, the frequency compensation may be performed separately at the FFT output of each receive antenna, but using the same frequency offset estimate.

Figure 11:
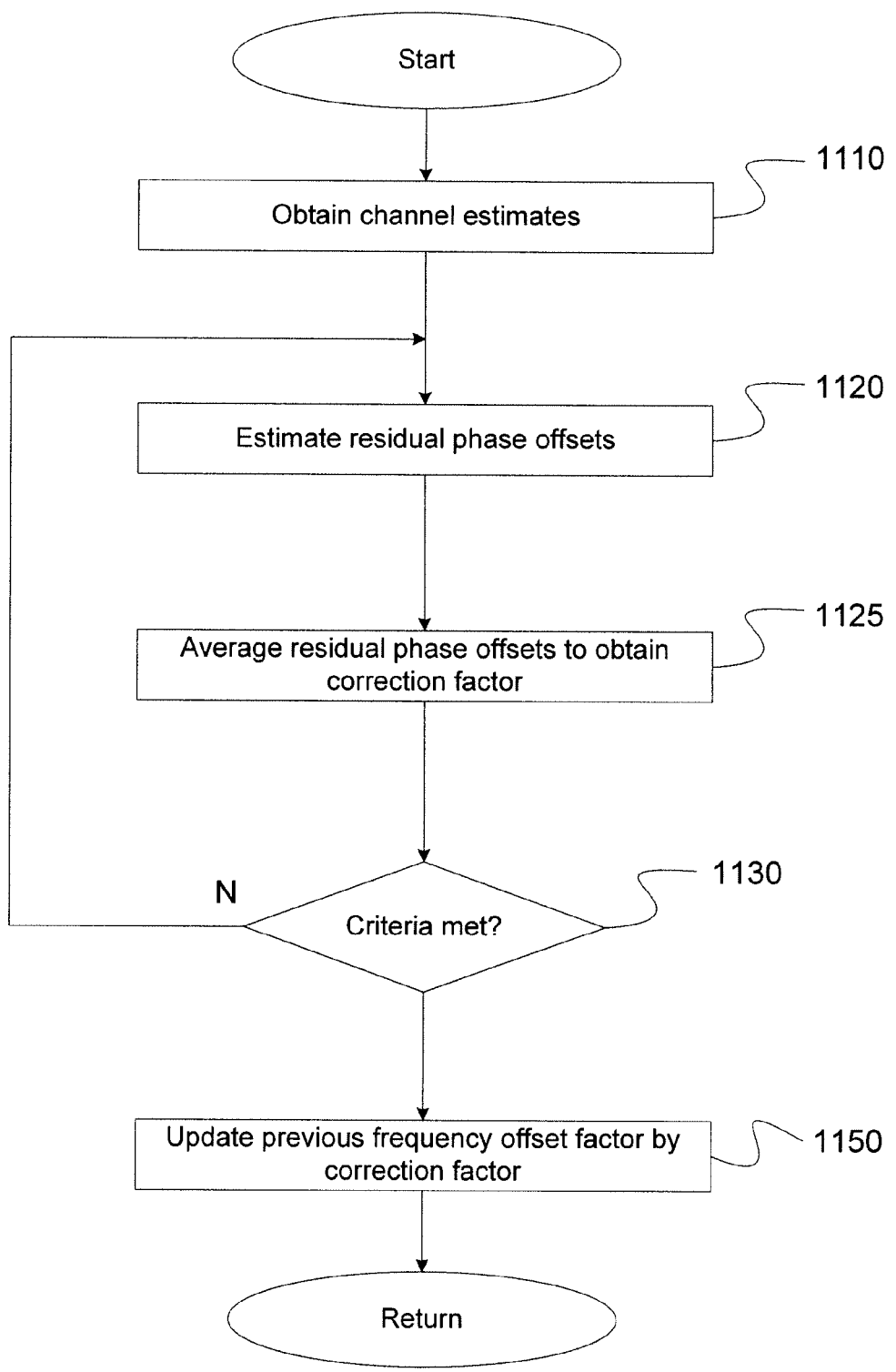
FIG. 11 is a flow diagram of a process for frequency offset update tracking in accordance with aspects of the invention.

FIG. 11 is a flow diagram of a process for frequency offset update tracking, according to aspects of the invention. The process obtains channel estimates in block 1110. Channel estimation may be performed by channel estimation blocks, which generally determine channel effects on signals based on variations between expected signals, usually provided by channel estimation symbols, and received symbols. The process continues by estimating residual phase offsets estimates in block 1120. The residual phase offsets may be determined using pilot tones, accounting for channel effects using the channel estimates.

Thus, in one embodiment, during frequency offset update tracking, the phase estimation block of a receiver, such as the receiver of FIG. 5, uses the pilot subcarriers embedded in the transmitted signal to derive a residual phase offset estimate $\Delta\phi_n$. $\Delta\phi_n$ is the phase difference between a current symbol n and the channel estimates, as obtained from the channel estimation symbols that arrive at the end of the preamble and before the header. In one exemplary embodiment shown in FIG. 3, the channel estimation sequence of the packet includes 6 OFDM symbols that are located after the packet synchronization sequence in the preamble and before the header of the packet. Under some standards, 12 pilot subcarriers may be embedded in the signal that are used to derive the residual phase offset estimate $\Delta\phi_n$.

Figure 12:
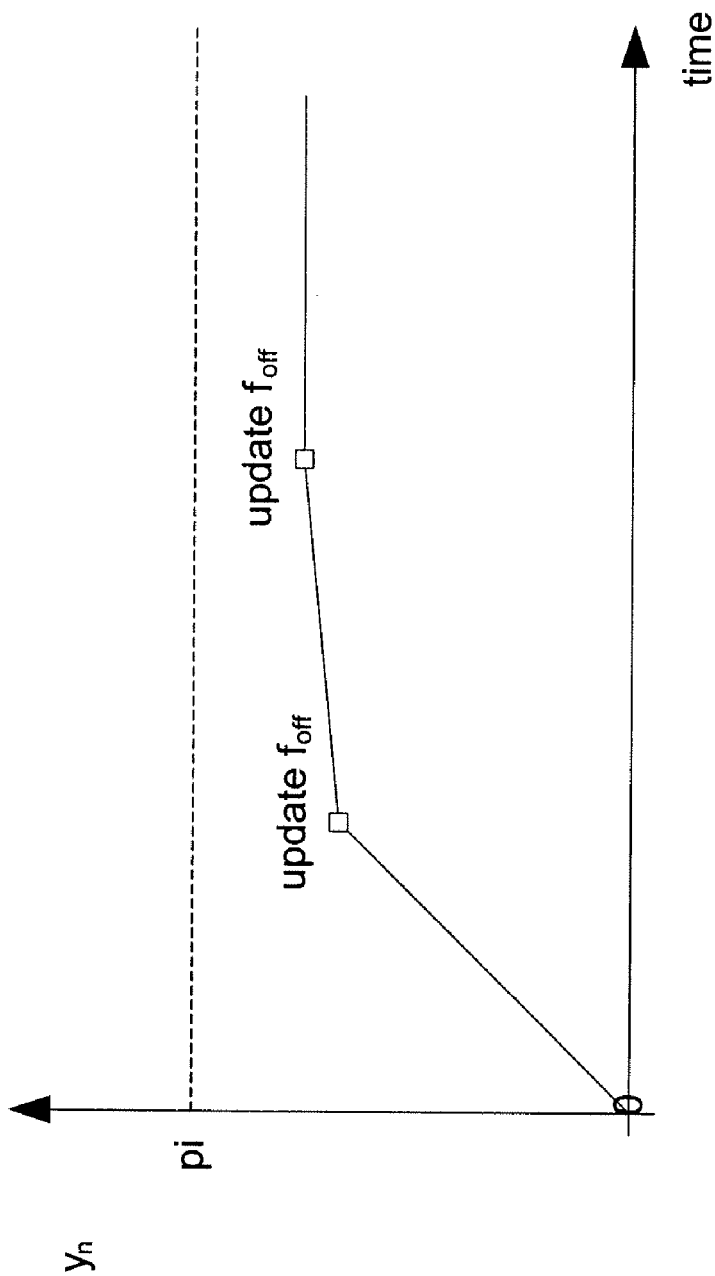
FIG. 12 is a plot of the progression of the residual phase offset versus time utilized for frequency offset update tracking in accordance with aspects of the invention.

In one embodiment, averaging the residual phase offsets to obtain a correction factor for the frequency offset factor in block 1130 includes finding a maximum likelihood estimate of the residual phase offsets that were obtained in block 1120. FIG. 12 is a plot of the progression of the residual phase offset versus time utilized for frequency offset update tracking. FIG. 12 illustrates the frequency offset update tracking for TFC 5, 6, and 7 that involve no frequency hopping. The cumulative phase offset $y_n$ is a cumulative difference between two successive residual phase offset estimates $\Delta\phi_{n-1}$ and $\Delta\phi_n$ at discrete times n−1 and n and is plotted versus the discrete time index n. Straight lines connect every two consecutive cumulative phase offset values $y_{n-1}$ and $y_n$. The slope of the line segments is equal to $(y_n-y_{n-1})/(1 \text{ symbol})=\Delta\phi_n$. Accordingly, when $\Delta\phi_n$ is large the slope of the straight line segment between $y_{n-1}$ and $y_n$ is large. When $\Delta\phi_n$ is small, the slope of the line segment becomes small. The slope of the line segments is used to estimate a residual frequency offset, which is applied to correct the current frequency offset factor $f_{off}$. From an average of the slopes, a residual frequency offset can be computed and applied to update the initial frequency offset factor and the previous value of the offset estimate. What are shown as straight lines in the FIG. 12 are actually and in practice a more noisy set of cumulative phase offset estimates $y_n$ at discrete times n.

One phase offset estimate $\Delta\phi_n$ is obtained per symbol n which is an average phase rotation over all of the subcarriers of the symbol n and indicates the base frequency offset.

Each line segment of $y_n$ corresponds to one slope $\Delta\phi_n$. From the set of points (n, $\Delta\phi_n$) the maximum-likelihood estimate of the slope of all or n line segments of $y_n$ is given by $$\text{SLOPE} = \frac{\sum n \cdot \Delta\varphi_n}{\sum n^2}$$

After each frequency update, the symbol counter n for computing the maximum likelihood slope SLOPE is reset to zero.

In some embodiments, correction factors are determined for each subband separately and averaged over the subbands. In that case, maximum likelihood measure of the residual phase offset is obtained for each subband separately and the values are averaged over the number of subbands to obtain one correction factor.

In one embodiment, the process in block 1130 determines if the criteria has been met or not. For example, a set number of symbols must be reached or the residual phase offsets must satisfy another criteria. As long as the criteria has not been met, the residual phase offsets are estimated in block 1120. Once the criteria has been met, the decision block 1130 allows the process to move forward to the next block. The frequency offset update can be, in various embodiments, triggered by various events. For example, the frequency offset update can be triggered when the cumulative phase offset estimate wraps around, i.e. crosses pi or −pi. Alternatively, the frequency offset update may be triggered after a predefined number of symbols.

Once the criteria is met in block 1130, the process updates the previous frequency offset factor in block 1150 by the correction factor obtained in block 1125. The correction factor in many embodiments is simply added to the frequency offset factor.

From the maximum likelihood slope SLOPE, an estimate of the residual frequency offset may be computed as: $f_{off,correction} = -\text{SLOPE}/(T_{SYMBOL}*f_{center})$ that is also dimensionless and is given in units of ppm. The updated estimate of the frequency offset factor is obtained from $f_{off,\ new} := f_{off} + f_{off,correction}$ or is defined according to the equation:

$$f_{off} := f_{off} + f_{off,correction}.$$

In one example discussed above $T_{SYMBOL} = 312.5$ E−9 and $f_{center}$ varies according to frequency subband. For TFC 1-4, that involve frequency hopping between different frequency subbands, each subband having a different $f_{center}$, a separate slope and residual frequency offset $f_{off,correction}$ is computed for each of the three subbands, as outlined above. The residual frequency offset used for updating the frequency offset factor is an average of residual frequency offset $f_{off,correction}$ over all three subbands. In other words, $f_{off,correction,\ 1} = -\text{SLOPE}/(T_{SYMBOL}*f_{center\ 1})$, $f_{off,correction,\ 2} = -\text{slope}/(T_{SYMBOL}*f_{center\ 2})$, $f_{off,correction,\ 3} = -\text{slope}/(T_{SYMBOL}*f_{center\ 3})$, and finally $f_{off,correction} = (f_{off,correction,\ 1} + f_{off,correction,\ 2} + f_{off,correction,\ 3})/3$.

For two or more receive antennas, the tracking is performed per receive antenna. The residual frequency offset used for updating the frequency offset estimate is an average over all receive antennas.

The process therefore returns, in some embodiments returning to block 1129.

Although exemplary embodiment of the invention have been described, the invention is not limited to the embodiments described and is intended to include various modifications included within the spirit and scope of the claims supported by this disclosure and their equivalents.

What is claimed is:

1. A method for frequency offset compensation in a communication system, comprising:
    determining a first measure of frequency offset in a received signal for a first frequency;
    determining a first frequency offset correction factor for use in compensating for frequency offset in received signals at the first frequency using the first measure;
    determining a plurality of second frequency offset correction factors for use in compensating for frequency offset in the received signals at a plurality of second frequencies using the first measure; and
    compensating for frequency offsets by: applying the first frequency offset correction factor to the received signals at the first frequency, and applying the plurality of second frequency offset correction factors to the received signals at the plurality of second frequencies, wherein determining a first measure of frequency offset includes:
    receiving a packet of the packets;
        determining the packet synchronization sequence corresponding to the time-frequency code of the packet;
    cross-correlating the samples of the symbols of the packet with the packet synchronization sequence to obtain cross-correlation results for the symbols of the packet, the cross-correlation results including cross-correlation peaks;
    removing the cover sequence from the cross-correlation results to obtain cross-correlations;
    averaging the cross-correlations over a window of samples about the cross-correlation peaks to obtain averaged cross-correlations for each of the symbols; autocorrelating the averaged cross-correlations using a first delay of symbols to obtain autocorrelation results, the first delay equal to a delay number;
        summing the autocorrelation results for a first group of symbols to obtain an initial offset vector, a number of the symbols in the first group equal to the delay number, the symbols of the first group being in the preamble; and
    dividing the initial offset vector by the delay number and by a duration of each of the symbols and by an inverse of the center frequency to obtain the initial frequency offset factor.

2. The method of claim 1, further comprising updating the first frequency offset correction factor and the plurality of second frequency offset correction factors.

3. The method of claim 2, wherein the received signals include symbols arranged in packets, the packets including a preamble followed by a payload, and wherein updating the first frequency offset correction factor and the plurality of second frequency offset correction factors includes: estimating residual frequency offsets for the symbols of the payload;
    obtaining a maximum likelihood estimate of the residual frequency offsets;
    obtaining a correction factor proportional to the maximum likelihood estimate; and
    adjusting the first frequency offset correction factor and the plurality of second frequency offset correction factors by the correction factor.

4. The method of claim 3, wherein estimating residual frequency offsets for the symbols of the payload includes estimating residual frequency offsets for a predetermined number of the symbols of the payload.

5. The method of claim 3, wherein estimating residual frequency offsets for the symbols of the payload includes estimating residual frequency offsets for the symbols of the payload while a cumulative residual phase proportional to a cumulative residual frequency offset remains below pi or above −pi.

6. The method of claim 1, wherein the received signals include symbols arranged in packets, the packets including a preamble followed by a payload, and wherein the expected signal is a packet preamble symbol.

7. The method of claim 6, wherein the expected signal is a packet synchronization symbol.

8. The method of claim 1, wherein determining a plurality of second frequency offset correction factors comprises adjusting the first frequency offset correction factor for differences between the first frequency and the plurality of second frequencies.

9. The method of claim 1, wherein determining a plurality of second frequency offset correction factors comprises determining an adjustment factor for differences between the first frequency and the plurality of second frequencies.

10. The method of claim 9, wherein applying the plurality of second frequency offset correction factors to the received signals at the plurality of second frequencies comprises:
applying the first measure to the received signal; and
applying the adjustment factor to the received signal.

11. The method of claim 10, wherein the first frequency offset correction factor and the plurality of second frequency offset correction factors are applied to received signals in the frequency domain.

12. The method of claim 1, wherein the first frequency is a center frequency of frequency subbands of the received signals, and wherein the plurality of second frequencies are subcarrier frequencies about the center frequency.

13. The method of claim 1, compensating for frequency offsets by applying the first frequency offset correction factor to the received signals at the first frequency and applying the plurality of second frequency offset correction factors to the received signals at the plurality of second frequencies.

14. The method of claim 1, wherein applying the first frequency offset correction factor to the received signals at the first frequency comprises derotating the received signals at the first frequency by an angle proportional to the first frequency offset correction factor.

15. The method of claim 1, wherein applying the plurality of second frequency offset correction factors to the received signals at the plurality of second frequencies comprises derotating the received signals at each of the plurality of second frequencies by an angle proportional to a corresponding one of the plurality of second frequency offset correction factors.

16. The method of claim 15, wherein compensating for frequency offsets by applying the first frequency offset correction factor to the received signals at the first frequency, and applying the plurality of second frequency offset correction factors to the received signals at the plurality of second frequencies comprises:
derotating the received signals at the first frequency by a first angle proportional to the first frequency offset correction factor; and derotating the received signals at the plurality of second frequencies by a plurality of second angles proportional to the first angle.

17. The method of claim 16, wherein derotating the received signals at the first frequency and derotating the received signals at the plurality of second frequencies include complex multiplication by a first derotating vector and a second derotating vector respectively.

18. A method for estimating and compensating frequency offset at a receiver of a multi-subcarrier communication system, the receiver receiving data included in packets, the packets each including a plurality of symbols and each including a preamble and a payload, the preamble including a first plurality of symbols and the payload including a second plurality of symbols, each of the plurality of symbols including a plurality of subcarriers, the method comprising:
estimating an initial frequency offset factor during the preamble;
obtaining an initial frequency offset value for each subcarrier of the plurality of subcarriers from the initial frequency offset factor;
compensating frequency offset for each subcarrier from the initial frequency offset value of the subcarrier;
estimating an updated frequency offset factor during the payload;
obtaining an updated frequency offset value for each subcarrier from the updated frequency offset factor; and
compensating the frequency offset for each subcarrier from the updated frequency offset value for the subcarrier, wherein the estimating of an initial frequency offset factor includes:
receiving a packet of the packets;
determining the packet synchronization sequence corresponding to the time-frequency code of the packet;
cross-correlating the samples of the symbols of the packet with the packet synchronization sequence to obtain cross-correlation results for the symbols of the packet, the cross-correlation results including cross-correlation peaks;
removing a cover sequence from the cross-correlation results to obtain cross-correlations;
averaging the cross-correlations over a window of samples about the cross-correlation peaks to obtain averaged cross-correlations for each of the symbols; autocorrelating the averaged cross-correlations using a first delay of symbols to obtain autocorrelation results, the first delay equal to a delay number;
summing the autocorrelation results for a first group of symbols to obtain an initial offset vector, a number of the symbols in the first group equal to the delay number, the symbols of the first group being in the preamble; and
dividing the initial offset vector by the delay number and by a duration of each of the symbols and by an inverse of the center frequency to obtain the initial frequency offset factor.

19. The method of claim 18, wherein the preamble includes packet synchronization symbols followed by channel estimation symbols, wherein the initial frequency offset factor is obtained from the packet synchronization symbols, and wherein during the channels estimation symbols, the frequency offset is compensated for each subcarrier from the initial frequency offset value.

20. The method of claim 19, wherein the compensating of frequency offset for each subcarrier from the updated frequency offset value for the subcarrier includes:
obtaining a phase rotation corresponding to the frequency offset for each subcarrier; and
derotating each subcarrier by the phase rotation.

21. The method of claim 18, wherein the payload includes a header followed by a data portion, wherein the frequency offset update tracking is performed starting with first header symbol, and wherein during the header and the data portion, the frequency offset for each subcarrier is compensated from the updated frequency offset value for the subcarrier.

22. The method of claim 18, wherein the preamble includes packet synchronization symbols followed by channel estimation symbols, wherein each symbol includes a plurality of samples, each of the samples being associated with one of the subcarriers, wherein the communication system communicates in a bandwidth divided into frequency subbands, wherein the symbols are transmitted in one frequency subband or hop between different frequency subbands according to a time-frequency code, wherein each time-frequency code corresponds to a center frequency, the center frequency being at a center of the one frequency subband or a center of a middle frequency subband of the different frequency subbands, wherein each time-frequency code is associated with a packet synchronization sequence, the packet synchronization sequence including a value for each of the samples of a symbol, the packet synchronization sequence being modulated by the cover sequence including +1 and −1.

23. The method of claim 18, wherein the window of samples includes 16 samples.

24. The method of claim 18, wherein the delay number is equal to a period of the time-frequency code.

25. The method of claim 24, wherein the delay number is 6.

26. The method of claim 18, wherein the first group of symbols includes last 6 symbols of the packet synchronization symbols.

27. The method of claim 18, wherein the communication system communicates over a range of frequencies divided into frequency subbands, each frequency subband having a bandwidth and a center frequency, each frequency subband corresponding to a subcarrier number of subcarriers, and wherein the obtaining of an initial frequency offset value for each subcarrier from the initial frequency offset factor, includes:
 dividing the bandwidth by the subcarrier number to obtain a subcarrier spacing;
 multiplying the subcarrier spacing by a subcarrier index for each of the subcarriers to obtain a multiple of the subcarrier spacing, the subcarrier index indicating a positive or a negative distance from the center frequency;
 adding a center frequency of a corresponding frequency subband to the multiple to obtain a subcarrier frequency for each subcarrier; and
 multiplying the subcarrier frequency for each subcarrier by the initial frequency offset factor to obtain the initial frequency offset value for each subcarrier.

28. The method of claim 27, wherein the compensating of frequency offset for each subcarrier from the initial frequency offset value for the subcarrier includes:
 obtaining a phase rotation corresponding to the frequency offset for each subcarrier; and
 derotating each subcarrier by the phase rotation.

29. The method of claim 18, wherein the symbols are communicated over a range of frequencies divided into frequency subbands, each frequency subband having a bandwidth and a center frequency, wherein the symbols have substantially equal durations, a duration of each of the symbols being a period, wherein the payload includes a header and a data portion, and wherein the receiver obtains a channel estimate from channel estimation symbols before the header for each packet, wherein the estimating of an updated frequency offset factor during the payload includes for the symbols of the payload:
 estimating a phase difference between each of the symbols and the channel estimate to obtain residual phase offsets, each residual phase offset corresponding to one of the symbols;
 obtaining a maximum likelihood estimate of the residual phase offsets to obtain a slope;
 dividing the slope by the center frequency and by the period to obtain a subband correction factor for each frequency subband;
 averaging the subband correction factors over the frequency subbands to obtain a correction factor; and
 subtracting the correction factor from a current frequency offset factor to obtain the updated frequency offset factor.

30. The method of claim 18, wherein the estimating of an updated frequency offset factor restarts after a first number of symbols.

31. The method of claim 18, wherein the estimating of an updated frequency offset factor restarts when one of the residual phase offsets crosses pi or −pi.

32. The method of claim 18, wherein each frequency subband corresponds to a subcarrier number of subcarriers, and wherein obtaining an updated frequency offset value for each subcarrier from the updated frequency offset factor includes:
 adding the center frequency to a multiple of subcarrier frequency spacing to obtain a subcarrier frequency for each subcarrier; and
 multiplying the subcarrier frequency by the updated frequency offset factor to obtain the updated frequency offset value for each subcarrier.

33. A method for compensating frequency offset at a receiver of a communication system, the signals being carried by a plurality of subcarriers, the receiver processing the signals first in time domain and next in frequency domain, the method comprising:
 estimating an initial frequency offset in the time domain for each subcarrier to obtain an estimated initial frequency offset;
 compensating frequency offset for each subcarrier using the estimated initial frequency offset of the subcarrier;
 updating the estimated initial frequency offset from data in the frequency domain to obtain updated frequency offset estimates; and
 compensating the frequency offset for each subcarrier from the updated frequency offset estimates for the subcarrier, wherein the estimating of an initial frequency offset includes:
 receiving a packet of the packets;
  determining the packet synchronization sequence corresponding to the time-frequency code of the packet;
 cross-correlating the samples of the symbols of the packet with the packet synchronization sequence to obtain cross-correlation results for the symbols of the packet, the cross-correlation results including cross-correlation peaks;
 removing the cover sequence from the cross-correlation results to obtain cross-correlations;
 averaging the cross-correlations over a window of samples about the cross-correlation peaks to obtain averaged cross-correlations for each of the symbols; autocorrelating the averaged cross-correlations using a first delay of symbols to obtain autocorrelation results, the first delay equal to a delay number;
  summing the autocorrelation results for a first group of symbols to obtain an initial offset vector, a number of the symbols in the first group equal to the delay number, the symbols of the first group being in the preamble; and
 dividing the initial offset vector by the delay number and by a duration of each of the symbols and by an inverse of the center frequency to obtain the initial frequency offset factor.

34. A receiver of multi-subcarrier communication, the multi-subcarrier communication being transmitted in packets comprised of symbols, each packet including a preamble followed by a header followed by a data portion, each preamble including packet synchronization symbols and channel estimation symbols, each symbol including a plurality of subcarriers, the receiver comprising:
  an antenna for receiving a packet from among the packets;
  a packet detections block coupled to the antenna;
  a transformation block coupled to the packet detection block, the transformation block being adapted to time domain to frequency domain transformation of the symbols;
  a channel estimation and compensation block coupled to the transformation block;
  a phase estimation and correction block coupled to the channel estimation and compensation block;
  a data processing block coupled to the phase estimation and correction block; and
  a frequency offset estimation and compensation block coupled between the transformation block and the channel estimation and compensation block and receiving input from the packet detection block and the phase estimation and correction block, wherein the frequency offset estimation and compensation block is adapted to:
  receive a time domain input from the packet detection block and generate an initial frequency offset estimation factor during the preamble of the packet, and receive a frequency domain input from the phase estimation and correction block and generate an updated frequency offset estimation factor during the header and the data portion of the packet starting with first header symbol, wherein the frequency offset estimation and compensation block is adapted to generate a subcarrier-specific frequency offset estimate from the initial frequency offset estimation factor and the frequency offset estimation factor, and wherein the frequency offset estimation and compensation block is adapted to compensate a frequency offset of each subcarrier in the frequency domain by derotating the subcarrier; and
  wherein the frequency offset estimation and compensation block includes an initial frequency offset estimation block coupled to the packet detection block, the initial frequency offset estimation block configured to perform the steps of:
    receiving a packet of the packets;
    determining the packet synchronization sequence corresponding to the time-frequency code of the packet;
    cross-correlating the samples of the symbols of the packet with the packet synchronization sequence to obtain cross-correlation results for the symbols of the packet, the cross-correlation results including cross-correlation peaks;
    removing the cover sequence from the cross-correlation results to obtain cross- correlations;
    averaging the cross-correlations over a window of samples about the cross-correlation peaks to obtain averaged cross-correlations for each of the symbols;
    autocorrelating the averaged cross-correlations using a first delay of symbols to obtain autocorrelation results, the first delay equal to a delay number;
    summing the autocorrelation results for a first group of symbols to obtain an initial offset vector, a number of the symbols in the first group equal to the delay number, the symbols of the first group being in the preamble; and
    dividing the initial offset vector by the delay number and by a duration of each of the symbols and by an inverse of the center frequency to obtain the initial frequency offset factor.

35. The receiver of claim 34, wherein the frequency offset estimation and compensation block includes:
  a current frequency offset estimation block coupled to the initial frequency offset estimation block;
  a frequency offset update tracking block coupled to the phase estimation and correction block; and
  a frequency offset compensation block coupled between the transformation block and the channel estimation an compensation block and coupled to the current frequency offset estimation block.

36. The receiver of claim 34, wherein during the preamble of the packet, the initial frequency offset estimation block receives time domain autocorrelation vectors for last symbols of the preamble from the packet detection block, and generates the initial frequency offset estimation factor by obtaining an average of angles of the autocorrelation vectors;
wherein
  the current frequency offset estimation block receives the initial frequency offset estimation factor from the initial frequency offset estimation block and generates the subcarrier-specific frequency offset estimate; wherein
  during the channel estimation symbols, the frequency offset compensation block uses the subcarrier-specific frequency offset estimate obtained from the initial frequency offset estimation factor to compensate for frequency offset of each subcarrier of the channel estimation symbols received from the transformation block; wherein
  during the header and the data portion, the frequency offset update tracking block receives phase offset estimates corresponding to the symbols of the header and the data portion from the phase estimation and correction block and generates the updated frequency offset estimation factor; wherein
  the current frequency offset estimation block receives the updated frequency offset estimation factor from the frequency offset update tracking block and updates the subcarrier- specific frequency offset estimate; and
  wherein during the header and the data portion, the frequency offset compensation block receives the frequency offset estimate from the current frequency offset estimation block and receives frequency domain symbols from the transformation block and provides frequency compensated symbols to the channel estimation and compensation block.

37. The receiver of claim 36, wherein the receiver comprises a plurality of receive antennas associated with a plurality of receive paths, each receive path including a packet detection block, a transformation block, an initial frequency offset estimation block, a frequency offset update tracking block, and a frequency offset compensation block, wherein each frequency offset update tracking block generates a separate updated frequency offset estimation factor, and wherein the separate updated frequency offset estimation factors are averaged to obtain the updated frequency offset estimation factor provided to the current frequency offset estimation blocks, wherein a same subcarrier-specific frequency offset estimate is used by all the receive paths, and wherein the frequency compensation is performed separately at an output of the transformation block associated with each of the receive paths.

38. A receiver of multi-subcarrier communication, the multi-subcarrier communication being transmitted in packets comprised of symbols, each packet including a preamble, each preamble including packet synchronization symbols and channel estimation symbols, each symbol including a plurality of subcarriers, the receiver comprising:
- a transformation block configured to perform time domain to frequency domain transformation of the symbols;
- a channel estimation and compensation block coupled to the transformation block;
- a phase estimation and correction block coupled to the channel estimation and compensation block;
- a data processing block coupled to the phase estimation and correction block; and
- a frequency offset estimation and compensation block coupled between the transformation block and the channel estimation and compensation block and receiving input from the packet detection block and the phase estimation and correction block, wherein the frequency offset estimation and compensation block includes an initial frequency offset estimation block configured to perform the steps of:

receiving a packet of the packets;
determining the packet synchronization sequence corresponding to the time-frequency code of the packet;
cross-correlating the samples of the symbols of the packet with the packet synchronization sequence to obtain cross-correlation results for the symbols of the packet, the cross-correlation results including cross-correlation peaks;
removing the cover sequence from the cross-correlation results to obtain cross- correlations;
averaging the cross-correlations over a window of samples about the cross-correlation peaks to obtain averaged cross-correlations for each of the symbols; autocorrelating the averaged cross-correlations using a first delay of symbols to obtain autocorrelation results, the first delay equal to a delay number;
summing the autocorrelation results for a first group of symbols to obtain an initial offset vector, a number of the symbols in the first group equal to the delay number, the symbols of the first group being in the preamble; and
dividing the initial offset vector by the delay number and by a duration of each of the symbols and by an inverse of the center frequency to obtain the initial frequency offset factor.

* * * * *